Patented Jan. 5, 1937

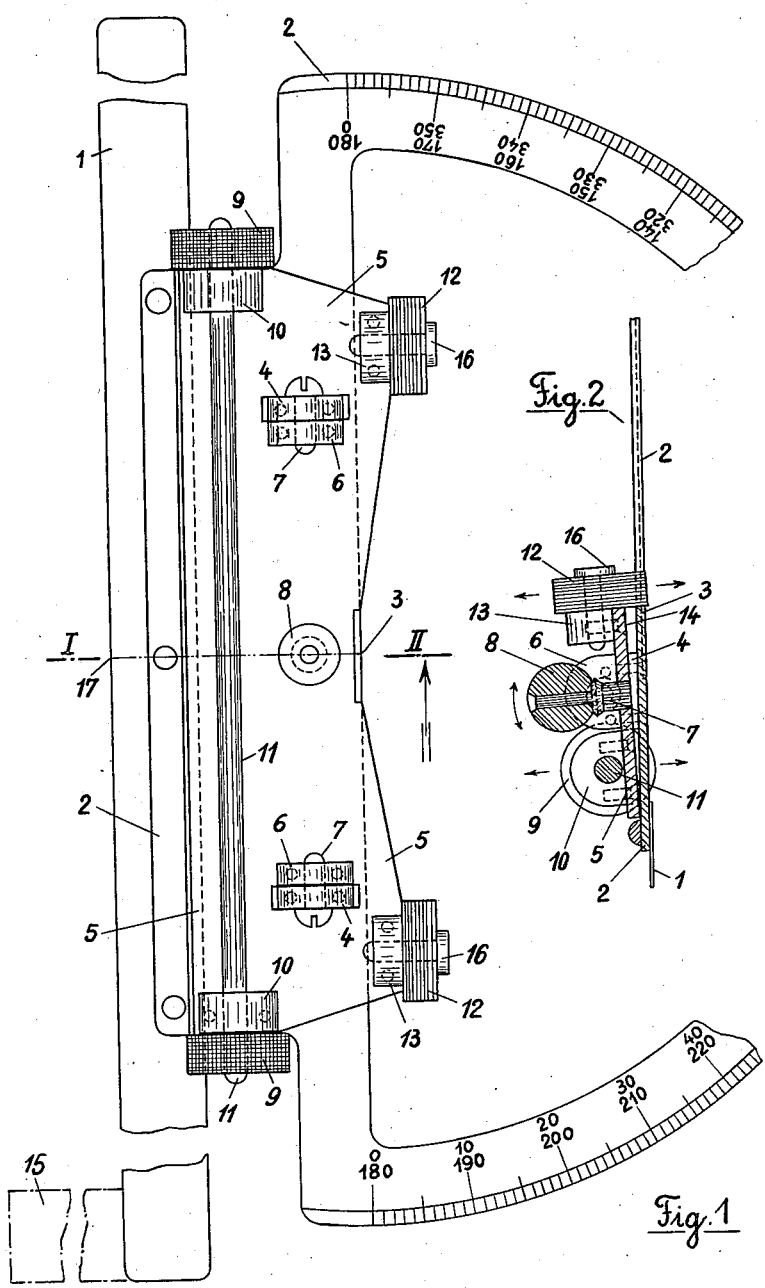

2,066,384

UNITED STATES PATENT OFFICE 2,066,384

NAUTICAL ANGLE-MEASURING AND DRAWING INSTRUMENT

Anny Bade, née Niethammer, Schonkirchen, Germany

Application January 2, 1934, Serial No. 704,915
In Germany January 13, 1933

7 Claims. (Cl. 33—109)

The present invention has for its object the provision of an instrument which is equally well suited for the solution of chart tasks in navigation, for the measurement of angles and for drawing and hatching purposes.

Nautical angle-measuring and drawing instruments fitted with a goniometer and a rule, which can be shifted by means of a pair of rollers are already known. Implements of this kind, however, suffer from various drawbacks, viz., that the instrument can be shifted always in one direction only, that, further, the rule has only a limited length, that the centre of the circular graduation is not visible, and, finally, that there is no possibility of lifting the pair of rollers from the surface of the chart or drawing. The fact, for example, that the known instruments can be shifted merely in one direction, confines its application only to a definite group of measurements and bearings or drawing work. For, course lines extending approximately parallel to the degrees of latitude cannot be measured and drawn, unless the rule by chance already when put onto the chart or the like is in close proximity of the line to be measured or drawn.

Instruments intended for similar purposes are likewise known, in which a parallel shift can be effected in more than one direction. This possibility, however, is obtained only by the implement being rigidly connected with the drawing plane or with a point thereof by a system of parallel links or the like and therefore this is not a handy instrument which can be put onto any chart or drawing board.

In order to achieve this last-named object and to overcome the drawbacks above-mentioned, according to the invention the instrument is equipped with two pairs of rollers, which selectively can be adjusted into working position and the rolling directions of which extend normally to one another and, respectively, in the 0°–180° direction and 90°–270° direction of the goniometer.

Furthermore, the pairs of rollers are adapted to be lifted from the drawing plane in such a manner, that, if the one pair is applied, the other pair is lifted automatically.

Finally, also the centre of the goniometer is fully visible.

Owing to these and further provisions hereinafter described, the instrument constructed in accordance with the present invention is equally well suited for all problems of the kind under consideration, it operates quickly and exactly and is handy and manufactured at low cost.

In order that the invention may be clearly understood and easily carried into effect, a preferred embodiment of the same is illustrated in the accompanying drawing, in which Figure 1 is a top view of the instrument and
Figure 2 a section on line I—II of Figure 1, seen in the direction of the arrow.

The instrument illustrated comprises a rule 1 of any desired length, which is made from any suitable flexible material and may have rigid to it a further leg 15 disposed at right angles thereon, so that it can be used for drawing purposes. The rule has rigidly or detachably connected to it a goniometer or protractor 2 of semicircular shape.

On the connecting piece of the goniometer are mounted two eye brackets 4, 4 over which a roller plate 5 can be slid by means of corresponding oblong holes. The plate 5 likewise carries eye brackets 6, 6, which by means of screw bolts 7 are pivotally connected with the eyes 4, 4, in such a manner, that a space 14, Figure 2, exists between the goniometer and the roller plate 5 and the latter is enabled to see-saw about the screw bolts 7.

A pair of rollers 9, 9 is mounted on the plate 5 by means of an axle 11 resting in bearing brackets 10, and a further pair of rollers 12, 12 each mounted on a journal 16 resting in a bearing bracket 13. A knob 8 is fixed to the plate 5 in the middle plane thereof between the pairs of rollers 9 and 12, which plane preferably passes also through the centre 3 of the goniometer and a corresponding mark 17 provided on the rule 1. This knob serves to press the one or other pair of rollers onto the plane of the chart or drawing, so that the whole instrument then can be shifted in the direction which corresponds to the running direction of the pair of rollers just applied. As it will be seen, the two pairs of rollers are arranged normally to one another and run in corresponding directions. The rollers further are knurled in a manner known per se, whereby an absolutely straight run is secured.

When the one pair of rollers is depressed onto the chart or drawing, the other pair is lifted therefrom and at the same time also the remaining parts of the instrument are discharged from their pressure upon the surface of the chart or drawing, so that any soiling of the latter or a damage of the chart is excluded to a great extent.

When no pressure is exerted upon knob 8, the instrument lies flat on the chart or drawing and has sufficient contact therewith to prevent unintentional lifting. It may still be noted, that owing to the rule 1 being made of flexible material, the instrument works satisfactorily also on uneven charts or drawings and that any unevennesses cannot cause shifting of the instrument from its correct position or path.

In the following are given some examples for the mode of operation of the instrument as described.

1. Bearing a course

The rule 1 is put on the chart in such a way that its front edge connects the representations on the chart of the position of the ship and its destination. Thereupon, after depressing one of the pairs of rollers, the instrument is rolled onto the meridian which is the most convenient to reach, in such a manner, that the centre 3 of the goniometer 2 touches the meridian. The degree wanted for the direction to be taken (the bearing) then can be read off on the graduations of the goniometer 2.

2. Drawing a course of 65° on the chart from a fixed point

In this case the sequence of the manipulations is inverse to that when ascertaining the bearing of a course. The centre 3 of the goniometer 2 and the 65 degrees-mark of the latter are adjusted to a meridian and, after depression of one of the pairs of rollers, the edge of the rule 1 is rolled onto the fixed point. A pencil line then drawn along the rule edge constitutes the course and terminates the operation.

3. Fixing the place of a ship

This operation in itself is nothing but the drawing of two different course lines from two given points. The point of intersection of the two lines then is the place of the ship.

As it will be seen, the manipulation of the instrument is very simple, exact and reliable. A particular advantage is to be seen in the fact, that the instrument can be manipulated by one hand and that the desired results can be obtained quickly and correctly even from the inaccessible corners of the chart.

Various modifications and supplements of the embodiment hereinbefore described are possible. So, for instance, the rollers 9 or 12 may have any desired width or may be designed as twin rollers. The arrangement of the pairs of rollers relatively to the rule 1 and goniometer 2 may be any desired. For example, both pairs of rollers may be disposed between the rule and the goniometer.

The goniometer may be movably connected with the rule in such a manner, that the aberration of the compass needle can be adjusted in advance. The rule as well as the leg 15 fitted for drawing purposes may be provided with graduations, more particularly in such a manner, that the two zero lines of both graduations lie in the corner. Such an arrangement of the graduations considerably facilitates the drawing work, since a useless shifting of the instrument is avoided thereby.

I claim:—

1. In an instrument of the class described a rule adapted to be put onto an even base without being in geared connection therewith, a pair of rollers adapted to guide, when in contact with said base, said rule in their rolling direction, another pair of rollers adapted to run in a direction normal to that of said first-named pair of rollers, and likewise adapted to guide, when in contact with said base, said rule in their rolling direction, said pair of rollers being laterally arranged in fixed mutual position, and means for selectively and solely bringing each of the two pairs of rollers into contact with the base.

2. In an instrument of the class described a rule adapted to be put onto an even base without being in geared connection therewith, a pair of rollers adapted to guide, when in contact with said base, said rule in their rolling direction, another pair of rollers adapted to run in a direction normal to that of said first-named pair of rollers, and likewise adapted to guide, when in their rolling in contact with said base, said rule in their rolling direction, said pairs of rollers being laterally arranged in fixed mutual position, means for selectively bringing said two pairs of rollers into contact with the base, and means adapted for completely lifting, upon depression of one of said pairs of rollers, the two rollers of the other pair from the base.

3. In an instrument of the class described a rule adapted to be put onto an even base without being in geared connection therewith, a goniometer connected with said rule, a pair of rollers adapted to guide, when in contact with said base, said rule in their rolling direction, another pair of rollers adapted to run in a direction normal to that of said first-named pair of rollers, and likewise adapted to guide, when in contact with said base, said rule in their rolling direction, said rolling directions extending, respectively, in the 0°–180° direction and 90°–270° direction of said goniometer, said pairs of rollers and said goniometer being arranged in fixed mutual position, and means adapted for completely lifting the two rollers of one of the pairs from the base upon depression of the other pair of rollers, and thereby lifting the rule or the goniometer, respectively.

4. In an instrument of the class described a rule, two pairs of rollers having their rolling directions normal to one another and adapted to guide said rule selectively in one of these rolling directions, an axle lying parallel with the direction of the rule and having rigid to it on each end a roller of one pair of rollers, means for revolubly connecting the axle to said rule, two journals connected to said rule and relatively distantly spaced from one another, said journals carrying the rollers of said other pair of rollers, said last-named rollers lying behind one another in their rolling direction, said pairs of rollers being laterally arranged in fixed mutual position, and a handle connected to said rule in the middle plane between said rollers.

5. In an instrument of the class described, a rule, two pairs of rollers being laterally arranged in fixed mutual position, having their rolling directions normal to one another and adapted to guide said rule selectively in one of these rolling directions, a roller plate, a fulcrum connecting it for see-saw-motion with said rule, an axle, having rigid to it on each end a roller of one pair of rollers and being revolubly mounted on the roller plate on one side of said fulcrum, two journals far distant apart from one another and mounted on the roller plate on the other side of said fulcrum, said journals carrying the rollers of said other pair of rollers, the last named rollers lying behind one another, and a handle fixed to said roller plate in the middle plane between said rollers.

6. In an instrument of the class described, a rule, a goniometer connected with said rule, two pairs of rollers being laterally arranged in fixed mutual position, having their rolling directions normal to one another and adapted to guide said rule and goniometer selectively in one of these rolling directions, an axle lying parallel with the direction of the rule and having rigid to it on each end a roller of one pair of rollers, means for revolubly connecting the axle to said goniometer, two journals connected to said goniometer and relatively distantly spaced from one another, said journals carrying the rollers of said other pair of rollers, last-named rollers lying behind one another in their rolling direction, and a handle arranged in the middle plane between said rollers.

7. An instrument of the class described and as specified in claim 6, in which said goniometer is semicircular and has a semicircular opening, said rule being arranged at a certain distance apart from said goniometer, a roller plate bearing the two pairs of rollers and the handle, a fulcrum connecting said roller plate with the rule and goniometer, extending in parallel to and near the 0°–180° line of said goniometer, one of said pairs of rollers projecting into the space existing between said rule and said goniometer, while the other pair of rollers projects into said opening of the goniometer.

ANNY BADE, née NIETHAMMER.